Jan. 13, 1970  J. C. STEFFEN ET AL  3,489,376
AIRCRAFT LANDING GEAR STEERING EXTENSIBLE DISCONNECT SYSTEM
Filed Nov. 9, 1967  3 Sheets-Sheet 1
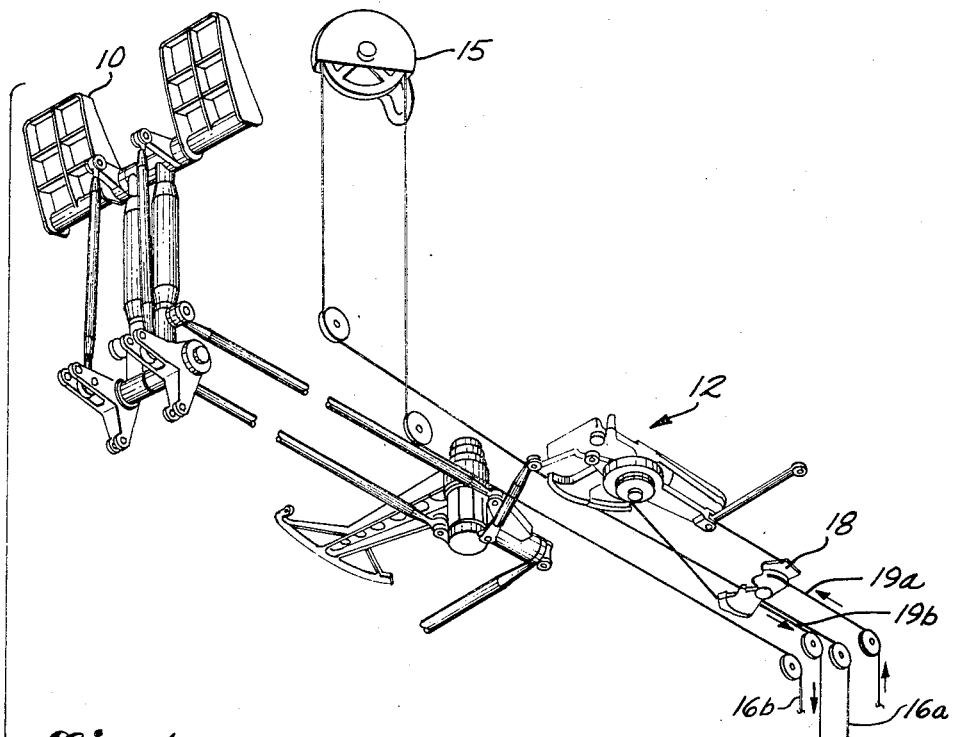
Fig. 1.
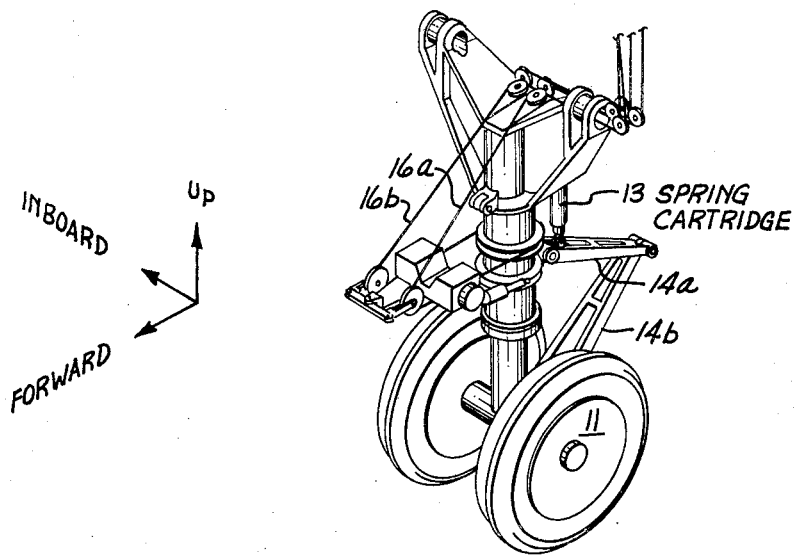
INVENTORS
JOHANNES C. STEFFEN
FRANZ WEBER
BY
Theron H. Nichols
AGENT

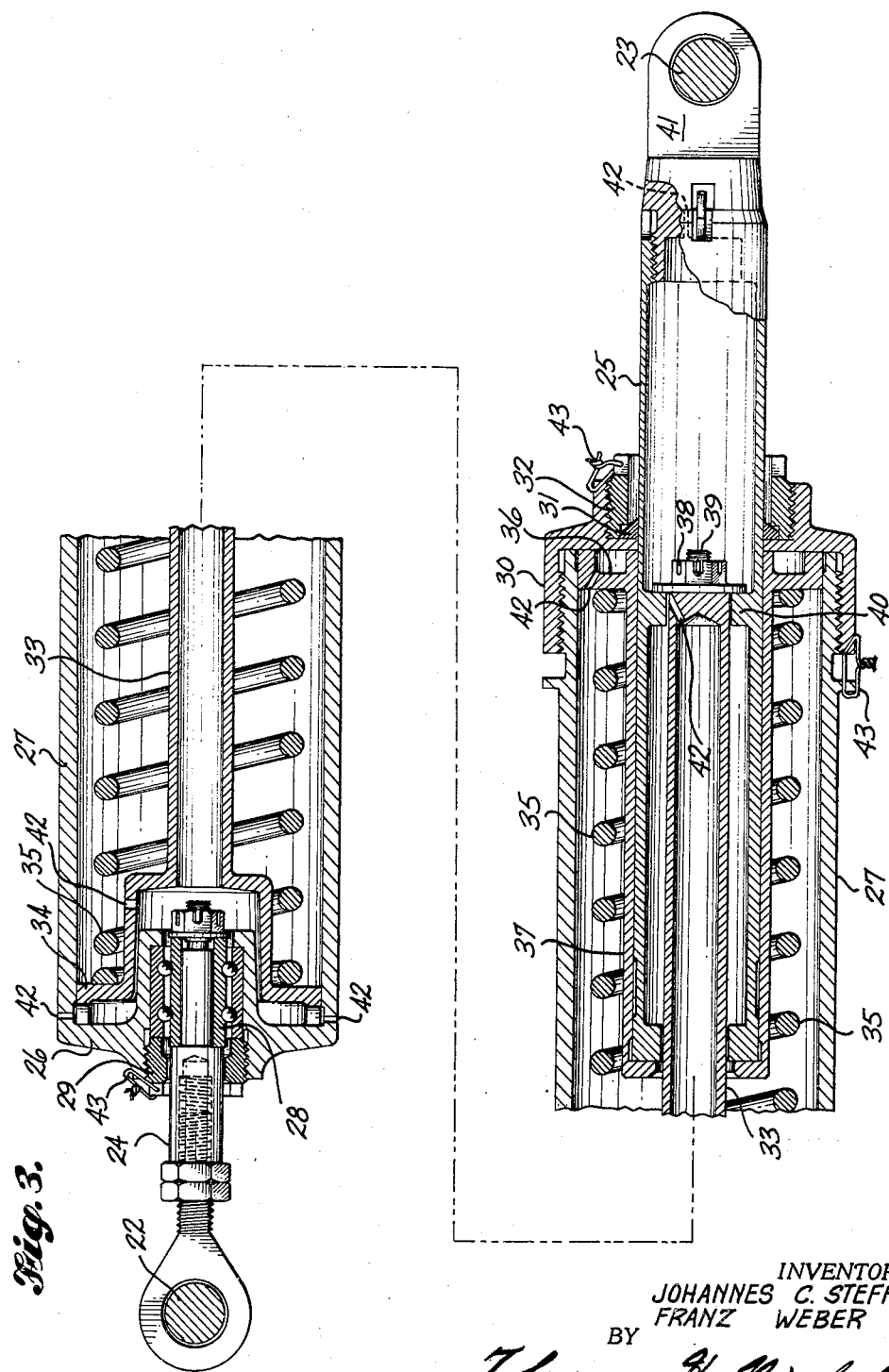

United States Patent Office 3,489,376
Patented Jan. 13, 1970

3,489,376
AIRCRAFT LANDING GEAR STEERING EXTENSIBLE DISCONNECT SYSTEM
Johannes Carl Steffen, Blomberg, Germany, and Franz Weber, Seattle, Wash., assignors to The Boeing Company, Seattle, Wash., a corporation of Delaware
Filed Nov. 9, 1967, Ser. No. 681,663
Int. Cl. B64c *25/50*
U.S. Cl. 244—50    11 Claims

ABSTRACT OF THE DISCLOSURE

An extensible spring cartridge connected between the torsion links of an aircraft nose wheel and the nose wheel steering disconnect system for disengaging the pilot's steering foot pedals and other ground steering control system from the nose wheel upon the wheel becoming airborne as detected by lowering of the wheel torsion links so that no drag on the foot pedal flight control system results while flying the aircraft nor will any turning forces be applied to the nose wheel either before or after it is retracted into its wheel well. Likewise, upon the aircraft touching down as detected by rising of the wheel torsion links due to compression of the shock strut, the nose wheel is reconnected with the pilot's ground steering system for positive ground control while taxiing and during takeoff, the steering disconnect cables always insuring positive control in both airborne positions by the extensible double acting spring cartridge, the latter also absorbing damaging movements of the landing gear beyond its normal limits.

BACKGROUND OF THE INVENTION

Field of the invention

This invention appears to be classified in class 244, subclass 50. "Special devices not ordinarily used in steering or propelling in flight, incorporated with aircraft structure and particularly adapted to provide for steering and/or propelling the aircraft on lan dor water or both."

SUMMARY OF THE INVENTION

The disclosed invention comprises the new combination with a steerable landing gear and manual steering system therefor of a steering disconnect system for engaging and disengaging the manual steering system from the steerable landing gear, as a nose wheel, for example, and an extensible spring cartridge which provides a reliable steering disconnect system during all vertical and side movements of the landing gear and absorbs all detrimental movements of the landing gear beyond its normal limits.

In the disclosed embodiment of the invention, the lower end of the extensible spring cartridge is pivotally connected to the nose wheel upper torsion link and the upper end is pivotally connected to a rotatable quadrant for actuating clutch cables for engaging or disengaging the nose wheel steering system. The latter system comprises the pilot's rudder pedals, linkages, cables, and a pilot-operated steering wheel. A predetermined preload tension is set in the extensible spring cartridge and held therein throughout all vertical and side movements of the nose wheel.

If so desired and if the aircraft is so designed, the steerable landing gear wheel may be a steerable tail wheel.

A problem in retractable steerable nose wheel aircraft wherein the pilot's rudder pedals and/or other steering wheels are used to turn the nose wheel while taxiing on the ground is that upon becoming airborne, any movement of the rudder pedals turns the nose wheel which causes an extra drag on the pedals. Likewise, extra loads on the nose wheel may result as a turned nose wheel is straightened by turning guides on the sides of the nose wheel well, or when the wheel is turned while inside its wheel well. Further, in all cases, the connection between the reciprocating torsion links and the quadrant should be taut with a positive precise preload thereon for accuracy and reliability of operation.

OBJECTS

Accordingly, a principal object of this invention is to provide an aircraft landing gear steering disconnect system with an extensible means for maintaining a predetermined preload in the system and for absorbing all landing gear extreme vertical movements.

Still another object of this invention is to provide a new and improved landing gear steering system utilizing a landing gear steering disconnect clutch responsive to vertical movements of an extensible means connected to the landing gear for engaging and disengaging the steering system.

Another object of this invention is to provide an aircraft landing gear steering system that does not have to be cut off or disconnected when turning the steerable wheel and its torque links up to 78°, for example, when towing the aircraft.

A still further object of this invention is to provide a new and improved aircraft landing gear steering system comprising a foot pedal steering system and a steering wheel system for controlling a steerable nose wheel, torsion links on said nose wheel, and an extensible preload means responsive to the torsion links for operating a clutch as the pedal steering system and the steering wheel system are engaged when the aircraft is taxiing on the ground and during takeoff, and disengaged when the aircraft is airborne.

Other objects and various advantages of the disclosed aircraft landing gear steering extensible disconnect will be apparent from the following detailed description, together with the accompanying drawings, submitted for purposes of illustration only and not intended to define the scope of the invention, reference being made for that purpose to the subjoined claims.

BRIEF DESCRIPTIONS OF FIGURES

The drawings diagrammatically illustrate by way of example, not by way of limitation, one form of the invention wherein like reference numerals designate corresponding parts in the several views in which:

FIG. 1 is a schematic view of the new nose wheel steering control system;

FIG. 3 is a detailed sectional view of the extensible spring catridge shown schematically in FIGS. 1 and 2.

DESCRIPTION OF THE PREFERRED EMBODIMENT

Figure 2:
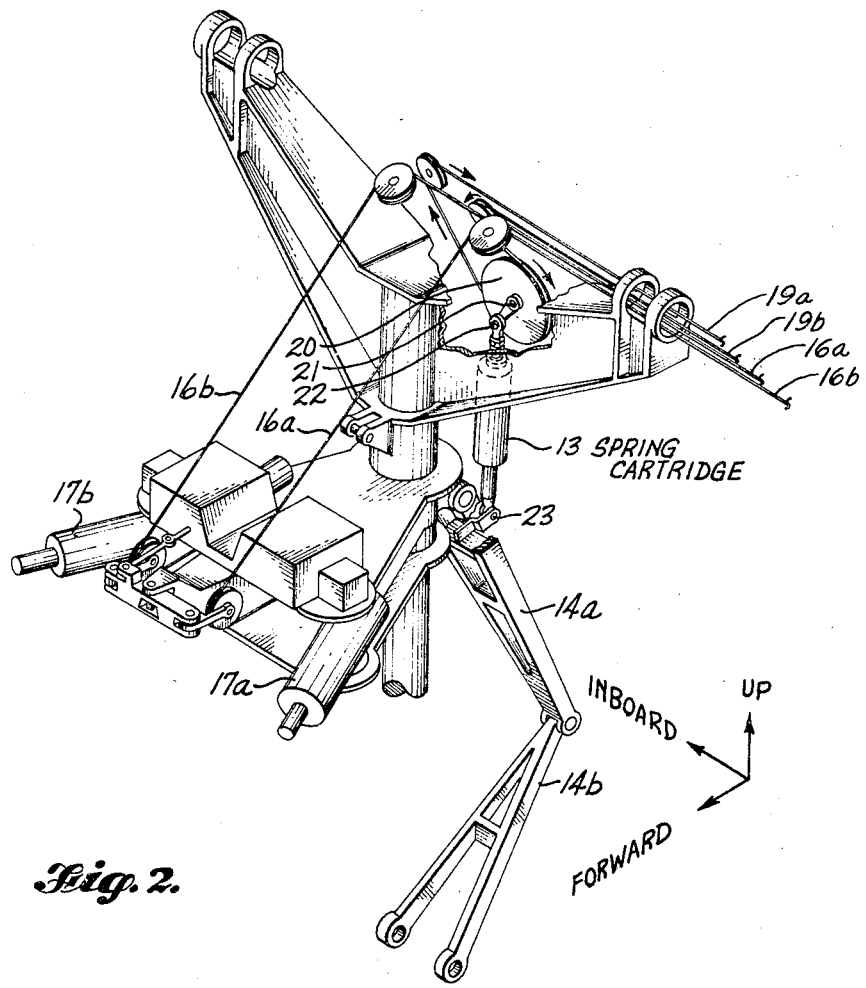
FIG. 2 is a schematic view, with parts cut away taken at 2—2 on FIG. 1.

The invention, the scope of which being defined in the appended claims, is not limited in its application to the details of construction and arrangement of parts shown and described, since the invention is capable of other embodiments and of being practiced or carried out in various other ways. Also it is to be understood that the phraseology or terminology employed herein is for the purpose of description and not of limitation.

FIG. 1 discloses the new landing gear steering extensible disconnect system. The basic elements of the new combination include a steering system for the retractable landing gear wheels such as the pilot's or manual rudder pedal controlled steering linkage 10 for controlling a retractable nose wheel 11, a clutch 12 for disengaging the steering linkage from the retractable nose wheel, and an extensible spring cartridge detecting means 13 for detecting when the aircraft is airborne for actuating the clutch 12 for disengaging the steering system from the nose wheel prior to retraction for removing drag loads from the pedals as the pilot maneuvers the aircraft in the air and for preventing damage to the nose wheel if turned as it is entering its wheel well or if turned after it is in the wheel well, and for engaging the nose wheel steering system after extension of the landing wheel. The detecting means 13, which is mounted on reciprocating torsion or scissors links 14a, and 14b, is extensible for ensuring accuracy and reliability of operation by always maintaining a positive preload on the connections between the scissors link 14a and the quadrant 20, FIG. 2, even though the nose wheel and its torsion links may be reciprocating vertically during taxiing.

As illustrated in FIG. 1, in addition to the rudder pedal steering linkage 10 is a steering wheel system 15 on the left side of the cockpit, also for controlling the nose wheel for steering the aircraft while taxiing on the ground, for example, the pedals being utilized for small turns, as up to 7° in either direction, and the steering wheel being utilized for turns of up to 78° in either direction. The linkage and cables of both ground steering systems 10 and 15 are integrated in the conventional clutch 12 from which come one pair of control cables 16a and 16b that extend down to two conventional steering actuators 17a and 17b, FIG. 2, on the nose wheel 11, FIG. 1.

The clutch 12, FIG. 1 is of the conventional cam and notch type of clutch controlled by a sector 18 rotated by a clutch actuating system comprising clutch control cables 19a and 19b which extend down to the nose wheel and terminate on quadrant 20, FIG. 2, which in turn is rotated by the spring cartridge extensible means 13 pivoted to the upper torsion link 14a for engaging or disengaging both steering systems from the nose wheel, the arrows indicating the direction of movement, FIGS. 1 and 2, for engagement of the steering systems immediately upon touchdown of the nose wheel on the ground.

Quadrant 20, FIG. 2, rotatably mounted on an extension of the nose wheel upper oleo shock strut with pin 21 is driven by the spring cartridge 13, the upper end of which being pivotally connected to the quadrant with pin 22. The lower end of spring cartridge 13 is pivotally connected with pin 23 to the upper torsion link 14a whereby upward contraction of the lower oleo strut and the resultant upward movement of the torsion links as when the aircraft lands and produces an upward movement of the spring cartridge and the resultant engagement of the clutch and the accompanying engagement of the foot pedals 10 with the nose wheel steering cables 16a and 16b for the steering of nose wheel 11, as indicated by movement of the clutch control cables in the direction of the arrows.

FIG. 3 discloses the spring cartridge 13 in greater detail wherein its upper adjustable end fitting 24, the left end as illustrated herein, is connected to the quadrant 20, FIG. 2, with pin 22, FIG. 3, and its inner telescopic lower rod 25, on the right end as illustrated, is pivotally connectable to the torsion link 14a, FIG. 2, with pin 23, FIG. 3. The cartridge upper end fitting 24 is rotatably attached to upper end 26 of cylinder 27 with bearings 28 and retaining nut 29, and cartridge lower end 25 is slideable in lower end cup nut 30 having a scraper 31 and retaining nut 32.

Internally of the spring cartridge cylinder 27, FIG. 3, is a shaft 33 with a piston 34 integral with the upper end thereof and shaped to receive one end of a compression spring 35. The other or lower end of the spring 35 is pressed against and fitted on a piston 36 integrally mounted on the lower end of retainer tube 37. Slideably protruding internally of tube 37 is the spring cartridge inner telescopic lower end of shaft 33, the latter shaft being adjustably retained in the lower rod 25 with compression adjusting nut 38 on the threaded lower end 39 of the shaft 33 pressing against internal flange 40 integral with the inner surface of the lower rod 25. End piece 41, is threaded on and keyed to the lower end 25 and is removable for permitting setting of the exact compression on the spring and resulting force required to change the distance between the two points or pins 22 and 23 to maintain a constant force in the extensible spring cartridge 13.

Air vents or drain holes 42, FIG. 3, are drilled through flanges 36 and 34, lower end of shaft 33, and cylinder upper end 26 to ensure positive and full action by the spring 35 in the spring cartridge. Likewise, safety wires 43 may be utilized as shown in FIG. 3.

In operation of the spring cartridge a compressive movement or movement to the right of pin 22, FIG. 3, tends to force shaft 33 to the right and telescoping into rod 25, compressing the spring 35. Likewise, a compressive movement or movement to the left of pin 23 due to raising of the torsion links when the aircraft touches the ground tends to force rod 25 through its end piece 41 to the left in telescopic relationship with shaft 33 and push retainer tube 37 to the left to compress spring 35. Any tension movement or movement to the left of pin 22 tends to pull to the left cylinder 27, retainer tube 37 and its flange 36 to compress spring 35. Likewise, any tension on pin 23 or movement to the right tends to pull rod 25 to the right which pulls shaft 33 and its piston 34 to the right to compress spring 35.

Also, any vertical movements of the torsion links beyond the limits of rotation of the clutch sector 18 or nose wheel quadrant 20 in either direction are thus taken up by the spring cartridge.

In operation of the aircraft landing gear steering extensible disconnect system, upon take-off of the aircraft the torsion links pivot downwardly as the nose wheel and lower shock strut drop, to thereby lower the spring cartridge which in turn actuates the clutch to disconnect the steering system from the landing wheel for freeing the steering system, as the rudder pedals, of the extra drag of moving the steerable landing wheel while controlling the aircraft in flight and for preventing damage to the steerable landing gear and/or its wheel well. Immediately upon touch-down the pilot operated steering system is engaged and likewise during takeoff by actuation of the clutch by the landing gear operated spring cartridge. The steering disconnect system, the spring cartridge absorbs all detrimental and damaging vertical movements of the landing gear beyond the normal movements such as resulting from an extra hard landing or from a sudden extending jerk as the wheel drops out of the wheel well prior to landing. Also during towing of the aircraft on the ground, the landing gear steerable wheel and torque links do not require disconnection or decoupling because the double acting spring cartridge permitted such turning movement.

While a method and only one embodiment of the invention have been shown in the accompanying specification and drawings, it will be evident that various other modifications are possible in the arrangement and construction of the disclosed aircraft landing gear steering extensible disconnect system without departing from the scope of the invention.

We claim:
1. In an aircraft having a steerable landing gear wheel and a manual steering control means for turning the wheel while taxiing the aircraft on the ground, a steering disconnect system comprising,
 (a) clutch means, said clutch means comprises means for engaging and disengaging said manual steering control means from said landing gear wheel,
 (b) extensible means, said extensible means comprises torsion link means for detecting when said aircraft is groundborne and airborne, and
 (c) said clutch means being responsive to said torsion link means for engaging said manual steering control means with said steerable landing gear wheel when said aircraft is groundborne for control thereof and for disengaging said manual steering control means with said wheel when said aircraft is airborne for decreasing the loads on said manual steering control means.

2. In an aircraft having a landing gear wheel, steering actuator means for turning said landing gear wheel, steering linkage means for controlling said actuator means, landing gear wheel shock strut means being compressible when the aircraft is groundborne, and torsion link means for said shock strut means for moving upwardly when said shock strut means compresses, a steering disconnect system comprising,
 (a) disconnect extensible rod means,
 (b) clutch means for engaging said steering linkage means with said steering actuator means,
 (c) quadrant means rotatably connected between said extensible rod means and said clutch means for being rotated in one direction by said extensible rod means to engage said clutch means and for being rotated in the other direction by said extensible rod means to disengage said clutch means, and
 (d) said disconnect extensible rod means being responsive to upward movement of said torsion link means for operating said quadrant means for engaging said steering linkage means with said landing gear wheel for controlling said aircraft while taxiing on the ground.

3. A steering disconnect system as recited in claim 2 wherein,
 (a) said disconnect extensible rod means comprises two resiliently interconnected telescopic elements connected between said torsion link means and said quadrant means for constantly maintaining a force on said quadrant means in all positions of said torsion link means.

4. A steering disconnect system as recited in claim 3 wherein,
 (a) said aircraft landing gear wheel is a nose wheel, and
 (b) said disconnect extensible rod means being responsive to said torsion link means for operating said quadrant means for engaging said steering linkage means with said nose landing gear wheel for controlling said aircraft while taxiing on the ground.

5. A steering disconnect system as recited in claim 3 wherein,
 (a) said aircraft landing gear wheel is a tail wheel, and
 (b) said disconnect extensible rod means being responsive to said torsion link means for operating said quadrant means for engaging said steering linkage means with said tail landing gear wheel for controlling said aircraft while taxiing on the ground.

6. A steering disconnect system as recited in claim 3 wherein,
 (a) said steering linkage means comprises aircraft foot pedal lateral control linkage means, and
 (b) said disconnect extensible rod means being responsive to upward movement of said torsion link means for operating said quadrant means for engaging said foot pedal linkage control means with said landing gear wheel for controlling said aircraft while taxiing on the ground.

7. A steering disconnect system as recited in claim 3 wherein,
 (a) said steering linkage means comprises steering wheel control linkage means, and
 (b) said disconnect extensible rod means being responsive to upward movement of said torsion link means for operating said quadrant means for engaging said steering wheel control linkage means with said landing gear wheel for controlling said aircraft while taxiing on the ground.

8. A steering disconnect system as recited in claim 3 wherein,
 (a) said shock strut means is extensible when the aircraft is airborne,
 (b) said torsion link means is movable downwardly when said shock strut means extends, and
 (c) said disconnect extensible rod means being responsive to the downward movement of said torsion link means for operating said quadrant means for disengaging said linkage means from said landing gear wheel for reduction of drag forces on said steering control linkage means when controlling said aircraft in the air.

9. In an aircraft having a landing gear wheel, steering actuator means for turning said landing gear wheel, steering linkage means for controlling said actuator means, shock strut means for said landing gear wheel being compressible when said aircraft is groundborne and extensible when said aircraft is airborne, and torsion link means for said shock strut means being movable upwardly with compression of said shock strut and downwardly with extension of said shock strut, a steering disconnect system comprising,
 (a) clutch means for engaging and disengaging said steering linkage means with said steering actuator means,
 (b) steering disconnect extensible rod means,
 (c) said torsion link means being responsive to compression and upward movement of said shock strut for moving upwardly when said aircraft is groundborne,
 (d) cable means operatively connected between said extensible rod means and said clutch means for being operated in one direction by said extensible rod means to engage said clutch means and for being operated in the other direction by said extensible rod means to disengage said clutch means,
 (e) said cable means being responsive to said upward movement of said torsion link means for controlling said clutch means, and
 (f) said clutch means being responsive to said cable means for engaging said clutch means so that said aircraft landing gear wheel is controlled by said steering actuator means while taxiing on the ground.

10. A steering disconnect system as recited in claim 9 wherein,
 (a) said torsion link means is responsive to extension and downward movement of said shock strut for moving downwardly when said aircraft is airborne,
 (b) said cable means being responsive to said downward movement of said torsion link means for controlling said clutch means, and
 (c) said clutch means being responsive to said cable means for disengaging said clutch means so that said aircraft landing gear wheel is free of said steering actuator while the aircraft is airborne.

11. In an aircraft having a steerable landing gear wheel, shock strut means for said landing gear wheel being compressible when said aircraft is groundborne and extensible when said aircraft is airborne, a steering disconnect system comprising,
 (a) rudder pedal steering means,
 (b) steering wheel means,
 (c) first steering cables operably connected between said rudder pedal steering means and said steering wheel means and said steerable landing gear wheel for steering the wheel,
 (d) clutch means operatively connected to said cable for engaging and disengaging said rudder pedal steering means with said steerable landing gear wheel, and
 (e) clutch actuating means comprising,
  (1) scissors link means responsive to compression and upward movement of said shock strut for moving upwardly when said aircraft is ground-borne,
(2) a spring cartridge connected between said scissors link means and a rotatable quadrant means, and
(3) second cables operatively connected between said rotatable quadrant means and said clutch for engaging said clutch when said quadrant means is rotated in one direction by said scissors link means for making said aircraft steerable landing gear wheel controllable by said foot pedals while taxiing on the ground, and for disengaging said clutch when said quadrant means is rotated in the other direction by said scissors link means for disconnecting said foot pedals from said steerable landing gear wheel when the aircraft is airborne.

References Cited

UNITED STATES PATENTS

| | | | |
|---|---|---|---|
| 2,420,276 | 5/1947 | Wood | 267—71 XR |
| 2,437,631 | 3/1948 | Wood. | |
| 2,578,897 | 12/1951 | Oliver | 244—50 |
| 2,621,002 | 12/1952 | Pittman | 244—50 |
| 2,657,883 | 11/1953 | Kupiec et al. | 244—50 |

FOREIGN PATENTS

| | | |
|---|---|---|
| 424,842 | 3/1911 | France. |
| 551,262 | 2/1943 | Great Britain. |
| 552,673 | 2/1943 | Great Britain. |
| 756,111 | 8/1956 | Great Britain. |

MILTON BUCHLER, Primary Examiner

P. E. SAUBERER, Assistant Examiner